United States Patent [19]
Baumgartner
[11] 3,786,477
[45] Jan. 15, 1974

[54] METHOD AND CIRCUIT ARRANGEMENT FOR SELECTIVELY DEPICTING LIKE SYMBOLS WITH DIFFERENT CONFIGURATIONS

[75] Inventor: Heinrich Baumgartner, Munich, Germany

[73] Assignee: Siemens Aktiengesellschaft, Berlin and Munich, Germany

[22] Filed: May 24, 1972

[21] Appl. No.: 256,385

[30] Foreign Application Priority Data
July 5, 1971 Germany .................. P 21 33 400.9

[52] U.S. Cl. ............................ 340/324 AD, 315/22
[51] Int. Cl. ............................................ G06f 3/14
[58] Field of Search ............... 340/324 AD; 315/18, 315/19, 22

[56] References Cited
UNITED STATES PATENTS

| | | | |
|---|---|---|---|
| 3,118,085 | 1/1964 | Clergue et al. | 340/324 AD |
| 3,379,833 | 4/1968 | Hecker et al. | 340/324 AD |

OTHER PUBLICATIONS
IBM Technical Disclosure Bulletin, Vol. 6, No. 4, Sept. 1963 by E. V. Weber, pp. 33, 34

*Primary Examiner*—John W. Caldwell
*Assistant Examiner*—Marshall M. Curtis
*Attorney*—Hill, Sherman, Meroni, Gross & Simpson

[57] ABSTRACT

A method for selectively depicting like symbols with different configurations upon the picture screen of a cathode ray tube, utilizing cooperable intensity control of the cathode beam and two coordinate deflection values derived from digital reference point coordinate values for designating the position at which the symbol involved is to be formed and digital symbol point coordinate values for designating the position of a beam-dot within the area in which the symbol is to be formed, with the reference and point digital coordinate values for each pair of cooperable reference and point coordinate values being combined and converted to form a corresponding analog deflection value, for each coordinate deflection direction, whereby the deflected cathode beam is operative, under cooperable intensity control, to depict such a symbol with a predetermined configuration, and a symbol with a different configuration is depicted by selectively varying the deflection in one coordinate direction by the utilization of an additional deflection value, in analog form, derived from the digital symbol point coordinate value utilized in the formation of the other deflection value; and control circuit arrangements for carrying out such method.

3 Claims, 18 Drawing Figures

METHOD AND CIRCUIT ARRANGEMENT FOR SELECTIVELY DEPICTING LIKE SYMBOLS WITH DIFFERENT CONFIGURATIONS

BACKGROUND OF THE INVENTION

The invention is directed to a method and circuit arrangement for selectively depicting like symbols with different configurations upon the picture screen of a cathode ray tube.

In producing symbols on a cathode ray tube, there is normally provided a suitable input or supply device, in combination with a decoder, at the output of which may be obtained digital reference point coordinates x and y which cooperably define a reference point on the picture screen identifying or designating the position of the symbol to be produced. The decoder also supplies digital symbol point coordinates dx and dy which are operable to define or designate the position of the symbol-producing dot or beam within the area on the picture screen which is to receive such symbol. Respective *x* deflection signals and *y* deflection signals are respectively derived from the corresponding reference point and symbol point coordinate values *x* and *dx*, and *y* and *dy*, with the *x* and *y* deflection signals being employed to effect deflection of the electron beam of the tube, under the control of suitable data pertaining to the intensity of the writing beam, which controlling data is likewise supplied by the decoder.

In order to emphasize individual symbols or symbol groups, as is known, like symbols may be differently represented i.e., provided with a different configuration. This may be effected, for example, by control of the brightness whereby the symbols are displayed with different degrees of brightness, by periodic or sequential changes in brightness, (for example by a blinking action), by providing an underlining of individual symbols, or by changing the symbol configuration, i.e., corresponding for example to the use of italics.

Prior art methods and circuit arrangements for carrying out the same, by means of which an emphasis may be provided of individual symbols, have generally required a relatively great technical expense. The present invention, in recognition of the advantages of providing some form of emphasizing individual symbols proceeds on the basis that an emphasis of individual symbols is also possible by inclining individual symbols in a manner similar to italic presentation, and proceeds therefrom to provide a method and circuit arrangement by means of which individual symbols may be emphasized in which the method and circuit arrangements for carrying out the same involve relatively little technical expense and will provide the desired emphasis by the selective inclination of selected symbols.

BRIEF SUMMARY OF THE INVENTION

In accordance with the method of the invention, the normally presented symbol configuration is altered by effecting a change in the deflection signal for one of the coordinate directions, normally the *x*- deflection signal, whereby the symbol appears upon the screen in an angularly changed or tilted position. This may be accomplished in a very simple manner by combining with or adding to the selected deflection signal an additional signal value derived from the symbol point ccordinate value pertaining to the other coordinate direction. Thus, assuming that the change is to be effected in the *x*-deflection signal, added to the coordinate values *x* and *dx* would be an additional value derived from the symbol point coordinate value *dy*. The changed symbol thus, while retaining the characteristic identifying configuration normally depicted, will be provided with a characteristic inclination to clearly identify the symbol with its changed but readily identifiable characteristic configuration. In practicing the invention, there may be included in the circuit arrangement a switch which in one switching state will enable the production of normal *x* and *y* deflection signals to produce a symbol of normal configuration on the picture screen, and by transfer of such switching means to a second switching state the selected symbol will be produced with the desired emphasizing inclination.

The present invention thus enables the depiction of individual symbols with either of two selectable configurations, to enable the selective emphasizing of individual symbols and further enables the practice of the method of the invention by circuit arrangements which are relatively simple and involve relatively little additional technical expense over the arrangements for producing the symbols in their normal fixed configurations.

In a preferred embodiment of the invention, a portion of the symbol point coordinate value *dy* is added to the symbol point and reference point coordinate values *dx* and *x*, in analog form, enabling, for example, practice of the invention by the addition of merely a single ohmic resistance and a single switch for effecting the desired symbol configuration. The desired inclination of the symbol can be readily adjusted by a variable dimensioning of such additional resistance.

In other preferred embodiments of the invention, the symbol point coordinate value *dy* may be supplied to a digital dividing stage and a portion of such coordinate value added to the reference and symbol point coordinate values *x* and *dx*.

A particularly advantageous solution is achieved when one half of the symbol point coordinate *dy* is utilized as the added italic forming portion, as in this case division can be derived by means of a simple digital place shifting, thus requiring no additional cost for the dividing stage.

BRIEF DESCRIPTION OF THE DRAWINGS

Referring to the drawings wherein like reference characters indicate like or corresponding elements or components.

DETAILED DESCRIPTION OF THE INVENTION

Figure 1:
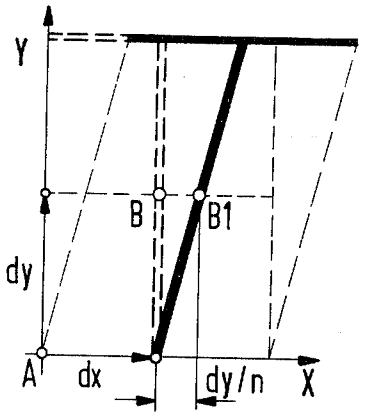
FIG. 1 illustrates two different configurations of the same general symbol, i.e. the letter "T"

Referring to FIG. 1 of the drawing, there is illustrated a symbol, namely the letter T, with two different configurations, one indicated in dotted lines representing the ususal or normal upright configuration, and the other, in solid lines, an inclined "italic" configuration. It will be appreciated that if the upright configuration of the symbol T is produced by a suitably deflected beam, the beam or dot point B will have, with respect to the reference point A, symbol point coordinate values d*x* and d*y*, thus identifying the position of the beam at any point along the symbol. If the symbol point coordinate values *dx* and *dy* of the point B are given, the abscissa coordinate value of the point B1 of the inclined symbol may be derived by adding a part of the coordinate value *dy*. In the present instance the symbol point coordinate values dy of the point is divided by a number *n* which, in the example of FIG. 1, equals 4.

Figures 2, 4:
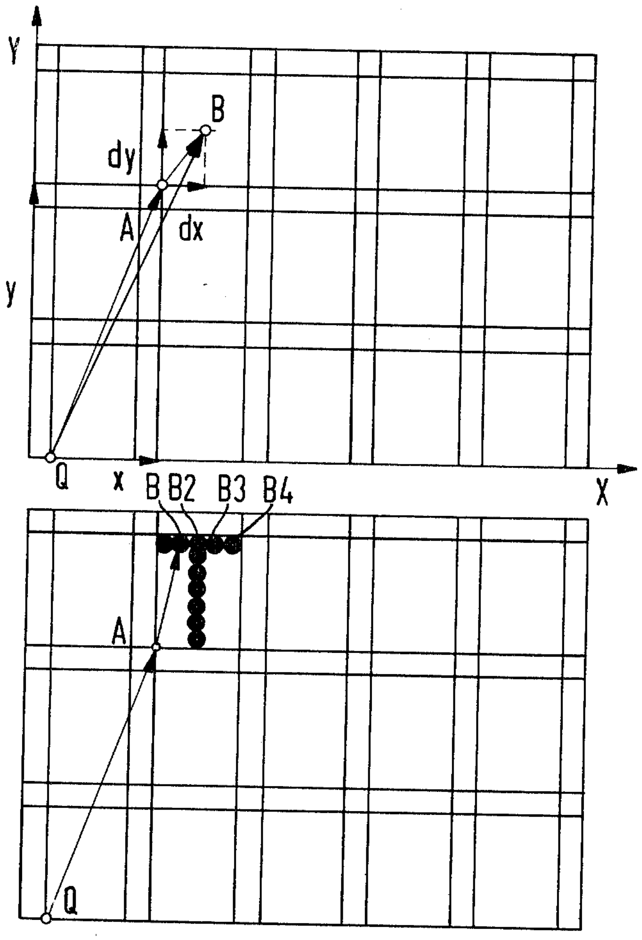
FIG. 2 is a diagram illustrating the general division of the picture screen on which the symbols are to be presented.
FIGS. 4 through 7 illustrate several variations in the formation of a symbol, utilizing the general circuit of FIG. 3.

FIG. 2 illustrates the position of the respective symbols on the picture screen of a cathode ray tube, with the screen being sub-divided into a plurality of fields, each of which may receive a single symbol. For simplicity, only a total of 15 fields are illustrated. Each area and thus each symbol has associated therewith a reference point identifying or designating the respective area, one of which reference points is designated by the letter A, in which the point of cathode beam impact is identified by the symbol point B. In this Figure it is assumed that the rest or undeflected point of the beam is that identified by the letter Q, with the cathode beam thus being deflected from the point Q to the point B along the line designated Q-B, with the vector Q-B comprising some of the vectors Q-A and A-B. The reference point coordinate values x and y thus define the position of the reference point A and thus the position of the symbol involved on the picture screen of the cathode ray tube. The symbol point coordinate values *dx* and *dy* characterize the position of the cathode beam within the field in which the symbol is to be disposed, and the point B thus may be defined in terms of *x* and *dx*, and *y* and *dy*. In other words, when a symbol is to be disposed in a specific field, the reference point coordinate values *x* and *y* must first be supplied to define the symbol position, followed by the symbol point coordinate values *dx* and *dy* which define the configuration of the selected symbol in the selected field.

Figure 3:
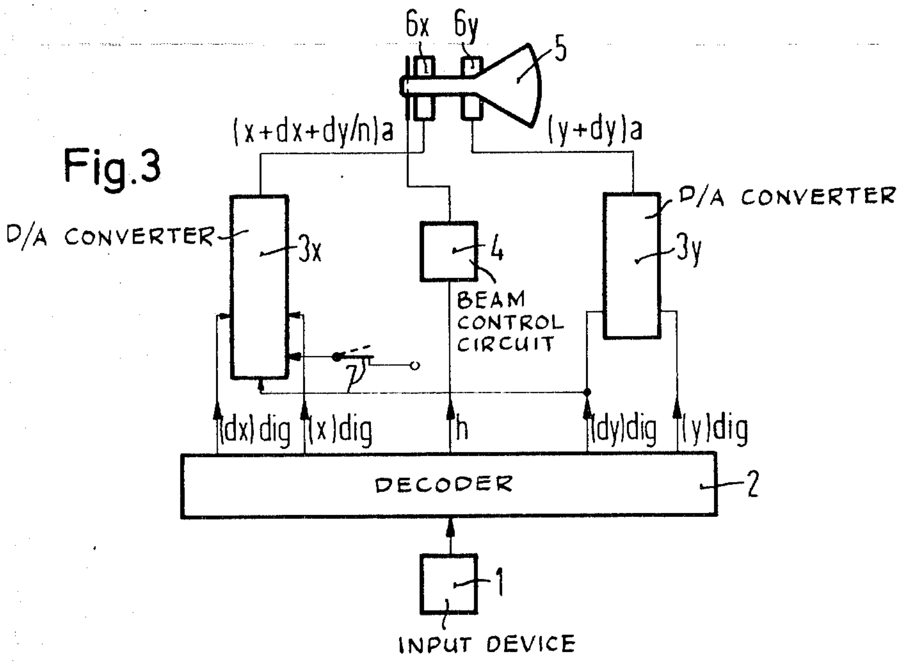
FIG. 3 is a general circuit arrangement broadly illustrating the provision for selective depiction of like signs with different configurations.

FIG. 3 illustrates, in block form, the basic or broad features of the method of the present invention and apparatus by means of which the method may be practiced. In the circuit arrangement illustrated, the reference numeral 1 designates a suitable input or supply device by means of which a symbol decoder 2 supplies the desired reference point coordinate values and the symbol point coordinate values to respective circuits 3*x* and 3*y* as well as information with respect to the intensity of the cathode beam to a control circuit 4, operative to control the intensity of the cathode beam of the tube 5. Reference numerals 6*x* and 6*y* designate the respective deflection systems of the tube 5, and 7 designates a selection switch for determining the desired configuration of the symbol to be produced. Thus all information required for defining the position and configuration of the symbol to be depicted on the picture screen of the cathode ray tube 5 are supplied under the control of the input device 1. To more clearly define the character of the respective signals, the signal *x*, *y*, *dx*, and *dy*, as well as additions thereof are identified as digital signals by the addition of the suffix "dig" while analog signals are identified by the suffix *a*. Thus it will be apparent that digital signals (*x*) dig, (*y*) dig are supplied at corresponding outputs of the symbol decoder 2 for defining the reference point coordinate values, and the symbol point coordinate values (*dx*) dig and (*dy*) dig for defining the symbol configuration. In addition, the decoder 2 may also supply signals *h* to a beam intensity control circuit 4, the output of which is supplied to the corresponding beam control grid of the tube 5.

In embodiment of FIG. 3, the circuit 3*y* is supplied with the two coordinate values (*dy*) dig and (*y*) dig, and is operative to combine the two and convert the same into an analog output value $(y + dy)a$. In like manner the circuit 3*x* is adapted to suitably combine the *x* coordinate values (*dy*) dig and (*x*) dig which may be suitably converted to provide the analog deflection valve $(x + dx)a$, with the two values representing the normal deflection signals operative to produce a symbol of normal configuration, such as illustrated in dotted lines in FIG. 1. The coordinate value (*dy*) dig is also supplied to the circuit 3*x*, for selective combining with the other coordinate values supplied to the circuit, the addition of the coordinate value (*dy*) dig being under control of the switch 7 whereby in one position such coordinate value is suitably added to the other values thereat, and in the other position of the switch 7 no such additional coordinate value is added. In other words, the switch 7 is operable to control whether the normal deflection signal $(x + dx)a$ is supplied to the deflection system 6*x* or a different configuration of the symbol is achieved by supplying to the deflection system 6*x* a deflection signal equal to $(x + dx + dy/n)a$ thereby producing an inclined symbol corresponding to the inclined "italic" symbol represented in solid lines in FIG. 1. Selection of the desired symbol configuration thus is dependent upon the operative position of the switch 7. As previously mentioned, during the formation of the desired symbol, the intensity of the cathode beam is controlled through the control stage 4. As details of this circuitry are not a part of the present invention, no additional details are submitted with respect thereto. In general, such control would be effected in the same manner as accomplished in prior art circuits involving symbol formation on a cathode ray screen.

As will be appreciated from the subsequent detailed description of preferred circuit forms for the practice of the present invention, the methode of the invention can be readily applied in all cases where signals are derived in correspondence upon reference point coordinate values and cooperable symbol point coordinate values. FIGS. 4 through 7 illustrate some examples of symbol production in which a selective inclined configuration of the particular symbol involved may be achieved by means of the present invention.

Figure 5:
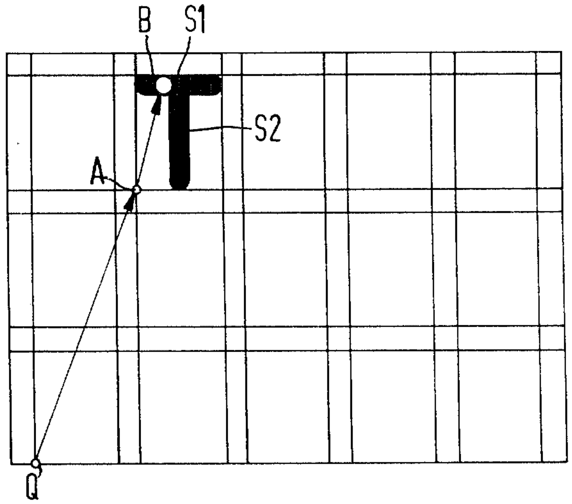
Figure 6:
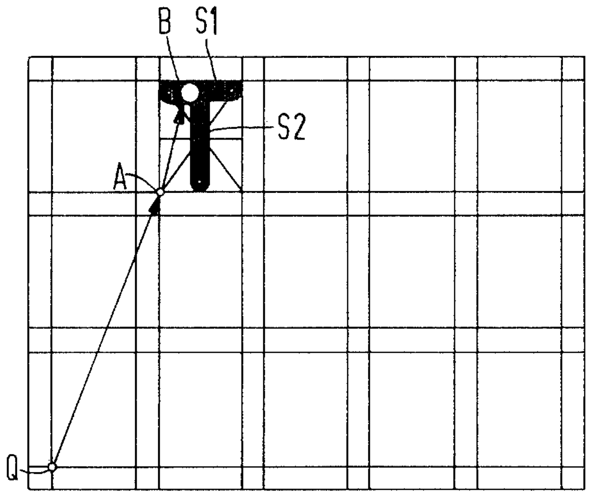
Figure 7:
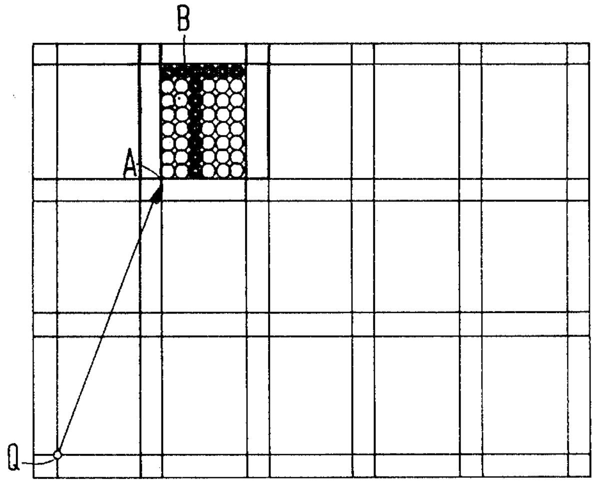

Thus in FIG. 4 the cathode beam is operative to produce a plurality of individual points B2, B3, B4 which when taken together depict the symbol T. In FIG. 5 the beam produces the two lines S1 and S2 which when taken together produce the selected symbol T. In the example of FIG. 6, the cathode beam moves in a predetermined raster, which for example may comprise the lines S1 and S2 as well as additional thin lines. When the raster lines are scanned, the intensity of the cathode beam is correspondingly increased or reduced to make visible only the desired symbol configuration. In the embodiment of FIG. 7, the cathode beam is operative to produce a symbol raster in the form of a plurality of points or dots, with the intensity of the cathode beam being so controlled that the symbol is defined by a plurality of selected points or dots.

Figures 8, 9:
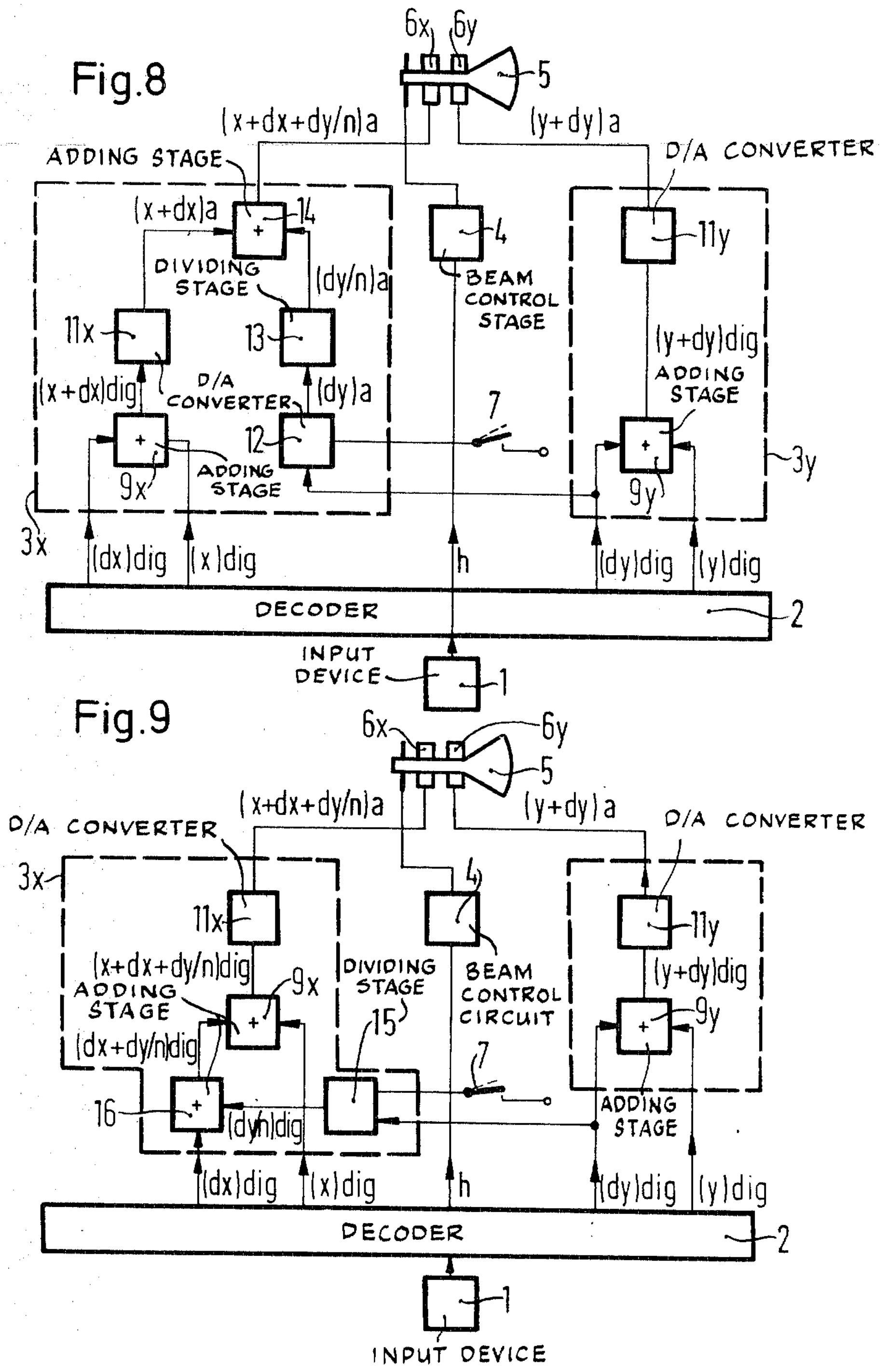
FIGS. 8 through 15 present illustrative circuit arrangements, generally corresponding to the circuit of FIG. 3, illustrating division and addition of the supplemental deflection value while in a digital or analog state and added to the normal values at different steps of formation of the latter.

FIG. 8 illustrates a circuit diagram, similar to FIG. 3, but with the respective circuits $3x$ and $3y$ each broken down into block components.

In this example the respective $x$ coordinate values $(dx)$ dig and $(x)$ dig are combined to form the total $(x + dx)$ dig which is then converted to a corresponding analog value which forms the $x$ deflection signal for normal symbol configuration, supplied to the deflection system $6x$. In like manner, the y coordinate values are combined, while in digital form, and thereafter converted to analog form for supply, as the normal deflection signal, to the deflection system $6y$.

In the event the inclined "italic" configuration is to be produced, the digital value $(dy)$ dig is converted to an analog value, divided to provide the value $(dy/n)a$, which analog value is then combined with the analog value $(x + dx)a$ to provide the $x$ deflection signal for producing the selected symbol with the desired inclined "italic" configuration. In practicing this embodiment of the invention, the digital coordinate values $(dy)$ dig and $(y)$ dig are supplied to an adding or combining stage $9y$, the output of which supplies the sum $(y + dy)$ dig to a digital-analog converter $11y$, and the output of which supplies the analog Y deflection signal $(y + dy)a$. In like manner the digital $x$ coordinate values $(dx)$ dig and $(x)$ dig are added in the combining or adding stage $9x$, the output of which is supplied to the digital-analog converter $11x$, with the output thereof supplying the normal $x$ deflection signal $(x + dx)a$, which, upon the selection of a symbol of normal configuration, is supplied without change to the $x$ deflection system $6x$ of the tube 5.

In the arrangement of FIG. 8 the digital $y$ coordinate value $(dy)$ dig is also supplied to the input of a digital-analog converter 12, the operation of which is controlled by the position of the switch 7, operable in one position to prevent the appearance of a signal at the output of the converter 12 and in the other position to supply to such output the analog coordinate value $(dy)a$ which in turn is supplied to the input of a dividing stage 13, with the analog value $(dy/n)a$ appearing at its output. The coordinate values appearing at the outputs of the dividing stage 13 and converter stage $11x$ are then combined in the combining or adding stage 14, with the output of such stage being operable to supply the $x$ deflection signal $(x + dx + dy/n)a$ to the deflection system $6x$. Thus by suitable operation of the switch 7 either a normal upright symbol may be produced or an inclined "italic" symbol.

FIG. 9 illustrates a somewhat similar circuit arrangement to that of FIG. 8, in which the y deflection signal is derived in the same manner as described for the circuit of FIG. 8. However, in this arrangement while the normal $x$ deflection signal $(x + dx)$ dig is derived by addition in the digital form, if the inclined "italic" configuration is to be employed, the divided digital coordinate value $(dy/n)$ dig is initially added to the digital $x$ coordinate value $(dx)$ dig and the resultant added with the digital coordinate value $(x)$ dig to produce the digital $x$ deflection valve $(x + dx + dy/n)$ dig which is then converted to the analog $x$ deflection signal $(x + dx + dy/n)a$.

In this arrangement the coordinate value $(dx)$ dig is supplied to one input of a combining or adding stage 16 while the coordinate value $(dy)$ dig is divided in the dividing stage 15, under control of switch 7, to provide the digital value $(dy/n)$ dig at the output of the adding stage 16 which, in turn is supplied to one input of the adding stage $9x$, the other input of which is supplied with the coordinate value $(x)$ dig. The resulting digital $x$ deflection value is then supplied to the converter $11x$ which converts the same into the analog deflection siganl $(x + dx + dy/n)a$.

Figures 10, 11:
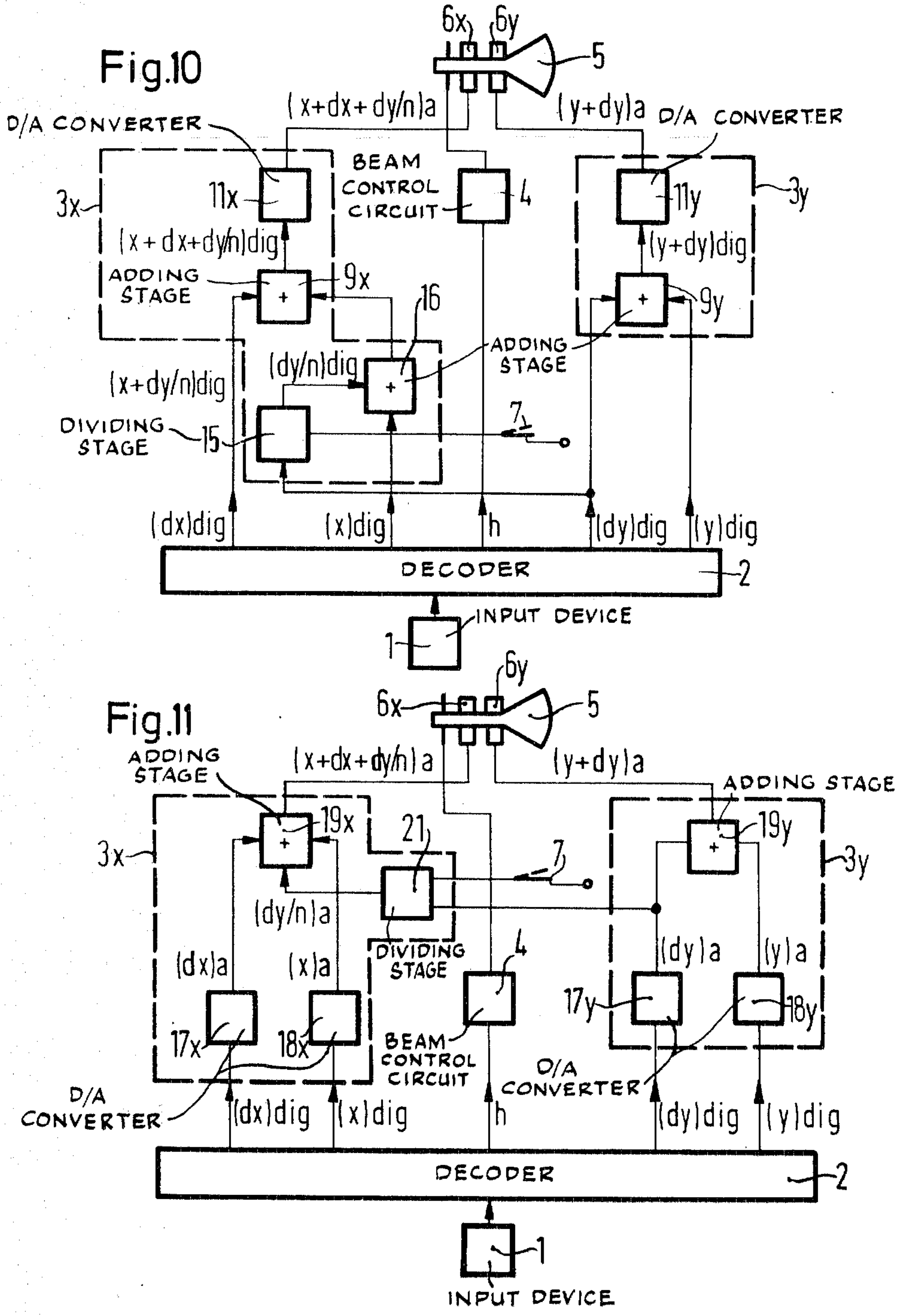

The circuit of FIG. 10 basically corresponds to the circuit of FIG. 9 with the exception that the digital value $(dy/n)$ dig is combined with the digital $x$ coordinate value $(x)$ dig, with the output of the adding stage 16 being added to the digital value $(dx)$ dig in the adding stage $9x$, and the resulting digital total converted to analog value in the converter $11x$.

It is also possible to employ merely a single digital adding stage in which all three values $(dx)$ dig, $(x)$ dig and $(dy/n)$ dig are added, and the resulting value converted in the analog digital converter $11x$.

FIG. 11 illustrates a particularly advantageous embodiment of the circuit arrangement illustrated in FIG. 3 in which both $y$ coordinate values are initially individually converted to analog values and then added to provide the $y$ deflection signal, and in like manner both digital $x$ coordinate values may be individually converted to corresponding analog values and then added along with a portion of the analog value $(dy)a$ in a single adding stage. Thus, the digital $y$ coordinate values are respectively converted in digital-analog converters $17y$ and $18y$ to the corresponding analog values, which are then combined in the adding stage $19y$ to provide the analog $y$ deflection signal $(y + dy)\,a$. In like manner the digital $x$ coordinate values are converted to corresponding analog values in the respective digital-analog converters $17x$ and $18x$, with the resultant analog values being combined in the adding stage $19x$. In this arrangement the analog value $(dy)a$, derived at the output of the converter $17y$ is conducted to a dividing stage 21 under the control of the switch 7, and the output $(dy/n)a$ from the dividing stage is also conducted to the adding stage $19x$, with the resultant $x$ deflections signal $(x + dx + dy/n)a$ being conducted from the output of the stage $19x$ to the deflection system $6x$.

The circuit arrangements of FIGS. 12–15 all illustrate the use of the same general type of circuit illustrated in FIG. 11, employing the identical circuitry for derivation of the $y$ deflection signal, namely individual analog-digital converters $17y$ and $18y$ operative to convert the digital Y coordinate values to corresponding analog values which are then combined in the adding stage $19y$ to provide the desired $y$ deflection signal. All of these circuits likewise employ respective digital-analog converters $17x$ and $18x$ which are operative to convert the respective digital $x$ coordinate values to corresponding analog values which are then combined in the adding stage $19x$, with the output thereof for the presentation of normal symbols comprising the deflection signal $(x + dx)a$. However, for adding the value $(dy/n)$ various combinations are utilized in the respective circuits.

Figure 12:
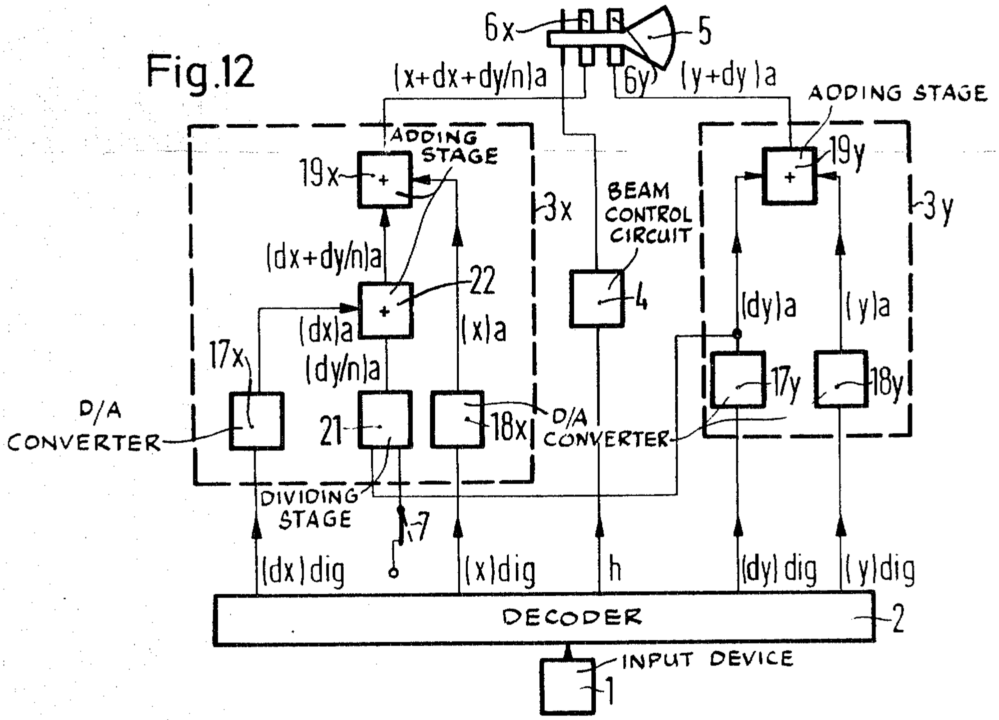

Thus, in FIG. 12 the value $(dy/n)$ is derived in analog form from the output of the converter 17$y$, divided in the dividing stage 21, under the control of the switch 7, to the corresponding analog value $(dy/n)a$ which, along with the output of the converter 17$x$, is supplied to the adding stage 22, whereby the output thereof comprises the analog value $(dx + dy/n)\ a$ which in turn is supplied, along with the output of the converter 18$x$, to the adding stage 19$x$ with the desired analog $x$ deflection signal appearing at the output thereof.

Figure 13:
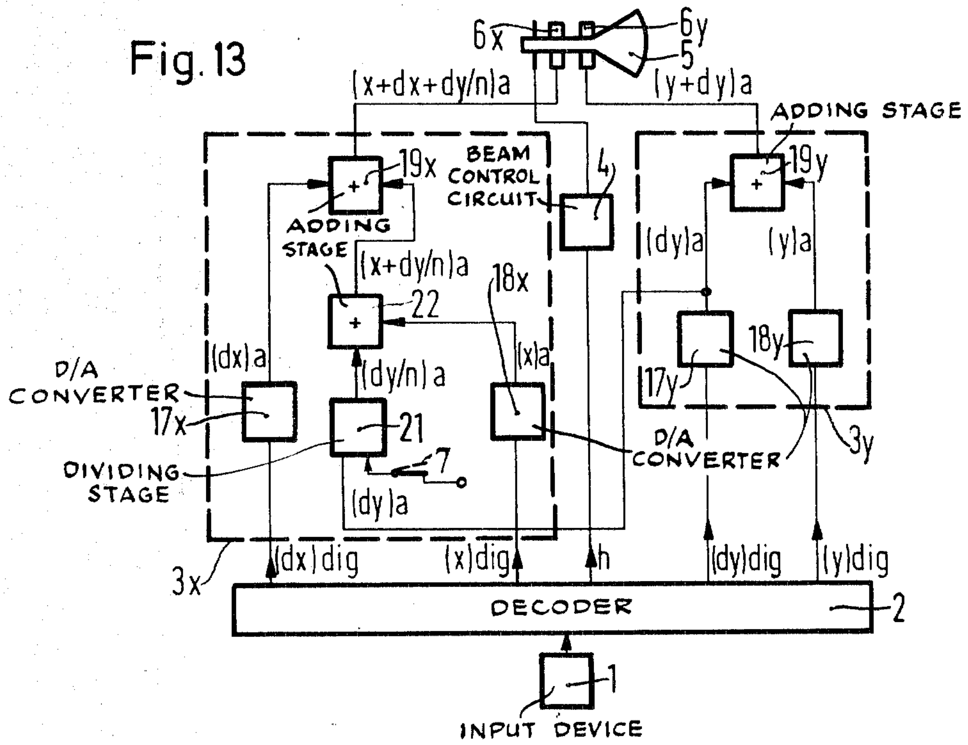

FIG. 13 functions in the same general manner as that of FIG. 12 with the only difference being that the analog value $(dy/n)a$ is initially added with the analog value $(x)a$ at the output of the converter 18$x$ in the adding stage 22, with the resultant output therefrom being combined with the analog value $(dx)a$, appearing at the output of the converter 17$x$, in the adding stage 19$x$, the output of the latter supplying the desired analog $x$ deflection signal.

Figure 14:
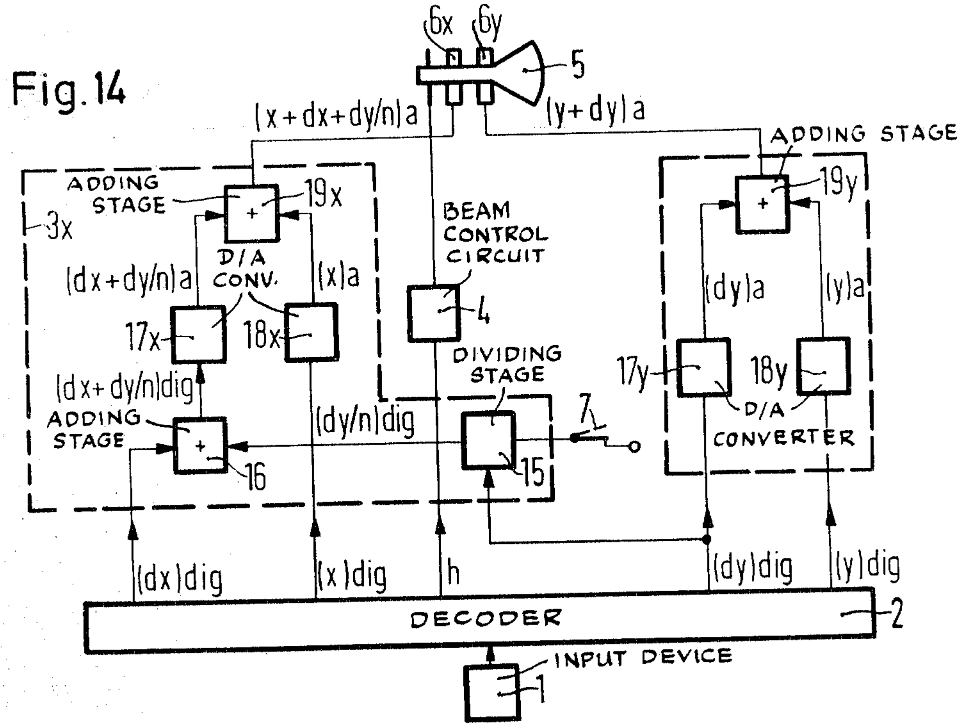
Figure 15:
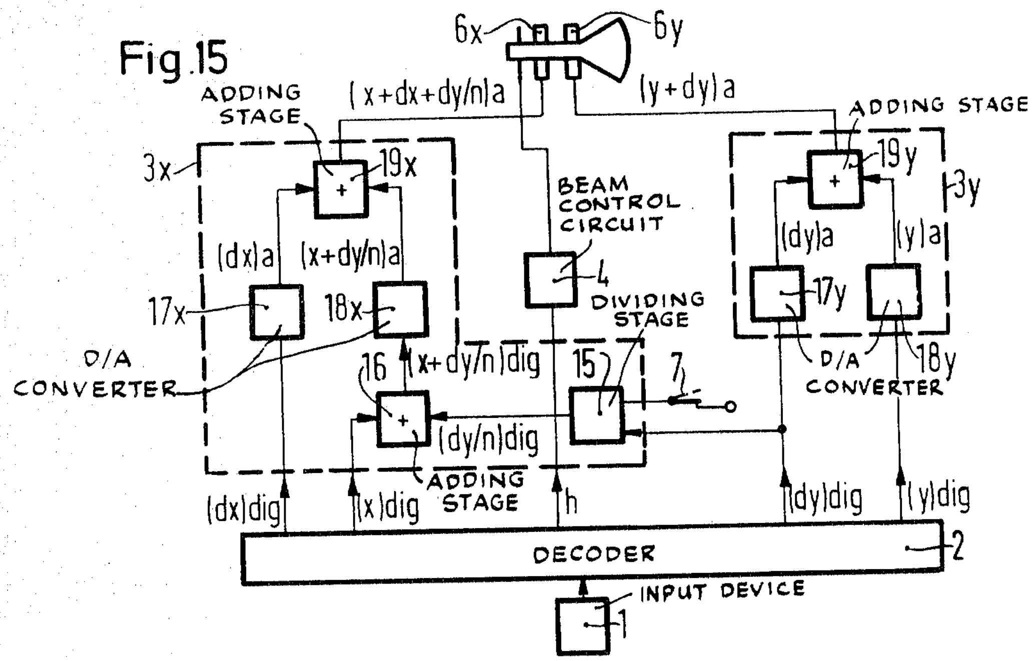

FIGS. 14 and 15 illustrate circuit arrangements in which the value $(dy/n)$ is combined with one of the $x$ coordinate values in digital form and the combined value then converted to the corresponding analog value, and subsequentially combined with the other $x$ coordinate value in analog form.

Thus, FIG. 14 illustrates the use of an adding stage 16 which is adapted to receive the digital value $(dx)$ dig and also the digital value $(dy/n)$ dig derived in the dividing stage 15, under control of the switch 7, from the digital value $(dy)$ dig. The combined value appearing at the output of the stage 16 $(dx + dy/n)$ dig is then supplied to the converter 17$x$ and therein converted to the corresponding analog value which is supplied to the adding stage 19$x$ along with the output $(x)a$ from the converter 18$x$.

The circuit of FIG. 15 differs from that of FIG. 14 only in that the adding stage 16 combines the digital value $(dy/n)$ dig and the $x$ coordinate value $(x\ )$ dig with the combined value $(x + dy/n)$ dig appearing at the output of the adding stage 16 being supplied to the converter 18$x$ with the analog value $(x + dy/n)a$ appearing at the output of such converter, in turn, being supplied to the adding stage 19$x$ along with the value $(dx)a$ at the output of the converter 17$x$, the $x$ deflection signal $(x + dy + dy/n)a$ thus appearing at the output of the adding stage 19x.

Figure 16:
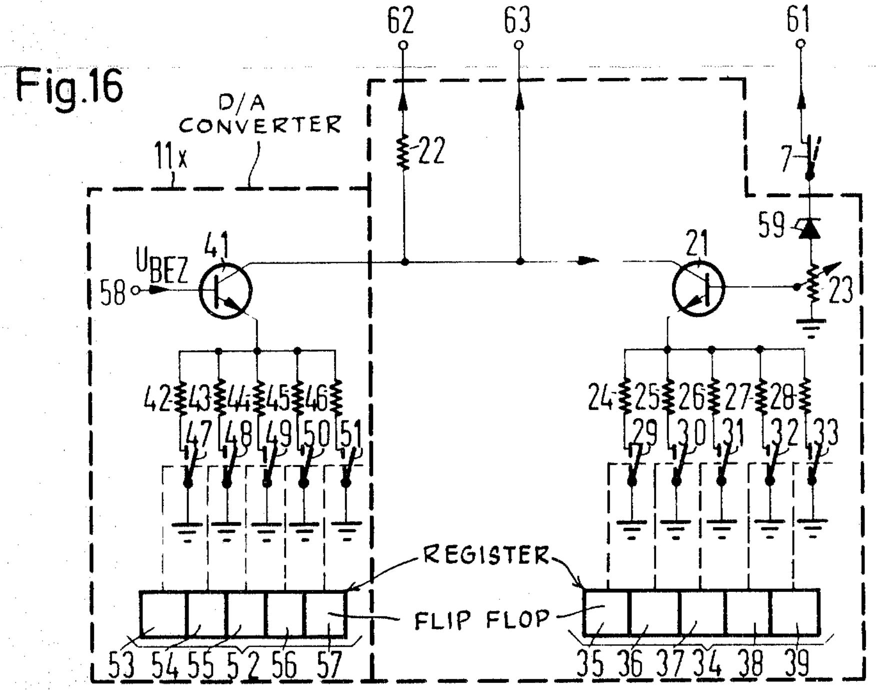
FIG. 16 illustrates details of the general circuit arrangement 3x illustrated in block form in FIG. 8.

FIG. 16 illustrates in greater detail the respective stages 11$x$, 12, 13, and 14 illustrated in FIG. 8. In this arrangement the stages 12, 13, and 14 illustrated in FIG. 8 are replaced by the transistor 21, resistor 22 through 28, switches 29 through 33 and register 34. The register 34 comprises a plurality of bistable switching stages 35 through 39 which, in known manner, may assume either of two stable states, one designated the 0 state and the other 1 state. For example, known flip-flop circuits may be employed as the bistable stages 35 through 39, whereby in the 0 state a 0 signal appears at the output of the associated stage and in the 1 state a 1 signal appears at such output, and it is believed that detailed description of such flip-flop circuits is unnecessary. The register 34 may have any desired number of stages therein, only five being illustrated for the purpose of clarity. The respective stages 35 through 39 are associated with respective digital values $2^0, 2^1, 2^2, 2^3, 2^4$, in corresponding order. The symbol point coordinate values associated with the coordinate axis Y, which characterize the particular symbol involved, are thus supplied to and stored in the register 34. Transistor 21, resistance 22 and resistances 24 through 28 and switches 29 through 33 comprise components of a digital-analog converter, in which the signal $(dy)$ dig stored in the register 34 is converted into a corresponding analog value $(dy)a$.

As previously mentioned, either a 0 signal or a 1 signal appears at the respective outputs at the stages 35 through 39, by means of which the respective switches 29 through 33 are controlled in known manner, for example utilizing electronic switches, which for example, may employ switching transistors. Assuming that the switches 29 through 33 are in open position, as illustrated in solid lines, when a 0 signal is present at the associated stage of the register 34, and closed, as illustrated in dotted lines, when a 1 signal is present. Consequently, in the presence of a 1 signal, the associated resistance 24 through 38 is connected to ground whereby a predetermined current will flow in the emitter circuit of the transistor 21 and over the collector resistance 22. The total current flowing through the circuit will thus be dependent on the number of switches 29 through 33 which are in a closed position as determined by the individual values in the register 34. The converter circuit 11$x$ is similarly constructed and comprises transistor 42, resistances 22 through 46, swtiches 47 through 51 and register 52 having bistable stages 53 through 57. As in the case of the register 34, the register 52 may contain any desired number of stages, only five being illustrated for the purpose of clarification. The respective digital value $(x + dx)$ dig at the output of the adding stage 9$x$, illustrated in FIG. 8, are supplied to the register 52 and in the same manner as previously described with respect to the digital-analog converter associated with the register 34. The analog value $(x + dx)a$ therefore appears at the collector of the transistor 41, with the resistance 22 thus forming a common load resistance for both transistors 21 and 41.

The desired operaton of the transistor 41 may be controlled by the application of a reference voltage $U_{BEZ}$ at the terminal 58. The operation of the transistor 21 is controlled by the potentiometer 23, by the adjustment of which the current flowing in the emitter-collector path of the transistor 21 can be adjusted, with such current corresponding to the italic portion of the coordinate values. The number $n$ (FIG. 1) is thus adjusted by means of the potentiometer 23, which is connected to the terminal 61 over diode 59 and switch 7, with the latter thus determining the operation or non-operation of the circuit. The operational or supply voltage for the circuits is operatively connected to the terminal 62 and to ground. The x-deflection signal, in analog form, is thus supplied at the terminal 63, from which it may be conducted to the deflection system 6x.

In comparing this circuit with the corresponding circuit of FIG. 8, as previously mentioned the converter 12 thereof is formed by the transistor 21, resistances 22 through 28, switches 29 through 33 and the respective stages 35 through 39 of the register 34. The transistor 21, resistance 22 and adjustable potentiometer 23 thus correspond to or represent the dividing stage 13, while the resistance 22, functioning as a common load resistance of the system, along with transistors 21 and 41, corresponds to or represents the adding stage 14 of FIG. 8. Thus, in this arrangement only the circuitry including the transistor 21, switch 7, resistors 23 through 28, switches 29 through 33 and the register 33 are additionally required over the normal circuitry to provide the desired italic symbol configuration.

The contacts of the switch 7, illustrated in FIG. 16 as being interposed between the diode 59 and the terminal 61 to which reference potential is to be applied, may in some applications advantageously be disposed directly into the line supplying the coordinate value (*dy*) dig, thereby controlling the presence or absence of such value at the register 34.

Figure 17:
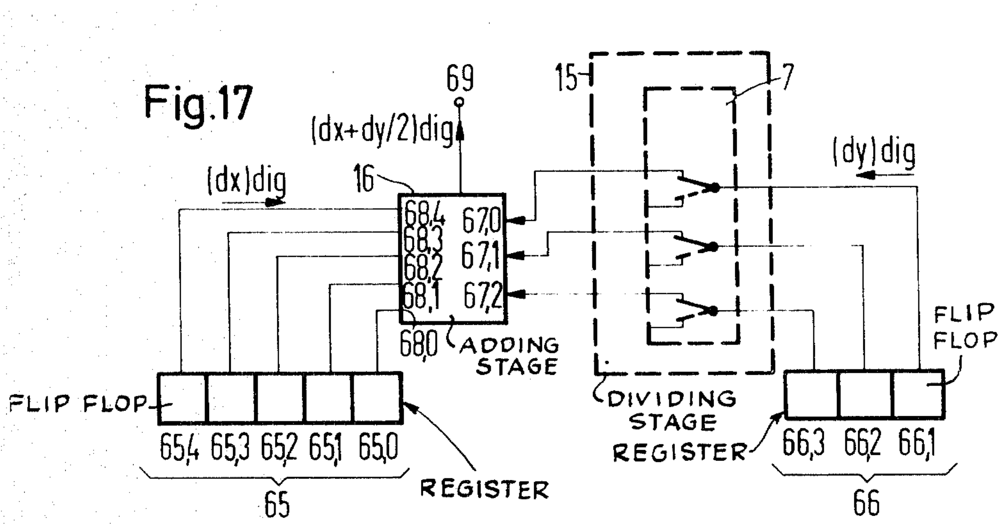
FIG. 17 illustrates, in greater detail, a dividing stage and an adding stage illustrated merely in block forms in FIGS. 9, 10, 14, and 15.

FIG. 17 illustrates in greater detail the circuits 15 and 16, illustrated in block form in FIGS. 9, 10, 14, and 15, together with the associated switch 7 and cooperable registers 65 and 66.

The register 65 is provided with a desired number of bistable stages 65.0 through 65.4 to which are assigned the values of $2^0$ through $2^4$ in corresponding order, with the bistable stages adapted to receive the *x* coordinate value (*dx*) dig and thus store the same therein with 0 or 1 signals appearing at the outputs of the register stages in known manner.

In like manner the register 66, comprising bistable stages 66.1, 66.2, and 66.3 with which are associated the values $2^1$, $2^2$, and $2^3$, is adapted to receive and store the coordinate value (dy) dig.

The adding stage 16 is provided with one set of inputs 67.0, 67.1 and 67.2 to which are assigned the respective values $2^0$, $2^1$, and $2^2$. The stage 16 is provided with a second set of inputs 68.0, 68.1, 68.2, 68.3 and 68.4 to which are respectively assigned the values $2^0$, $2^1$, $2^2$, $2^3$, and $2^4$ respectively. Thus, in the operation of the adding stage 16, the digital values supplied to it are added in known manner. The dividing stage 15 is particularly simple in construction as a displacement of digits representing the digital number, stored in the register 66, is effected for the case $n = 2$, while controlling the transfer of signals from the register 66 to the adding stage 16. Thus, the output the register stage 66.1, associated with the digit value $2^1$ is connected with the input 67.0 of the adding stage 16 and thus associated with the digital value $2^0$. In a similar manner the output of the stages 66.2 and 66.3 are respectively connected with inputs 67.1 and 67.2 respectively which are respectively assigned to a lower binary digit value than the corresponding stages of the register 66. In this manner, the binary number (*dy*) dig supplied by the register 66 is halved and the binary (*dy*/2) dig is thereby supplied to the inputs 67.0 through 67.2 of the adding stage 16 with the corresponding combined digital signal ($dx + dy/2$) dig appearing at the output terminal 69 of the adding stage.

Figure 18:
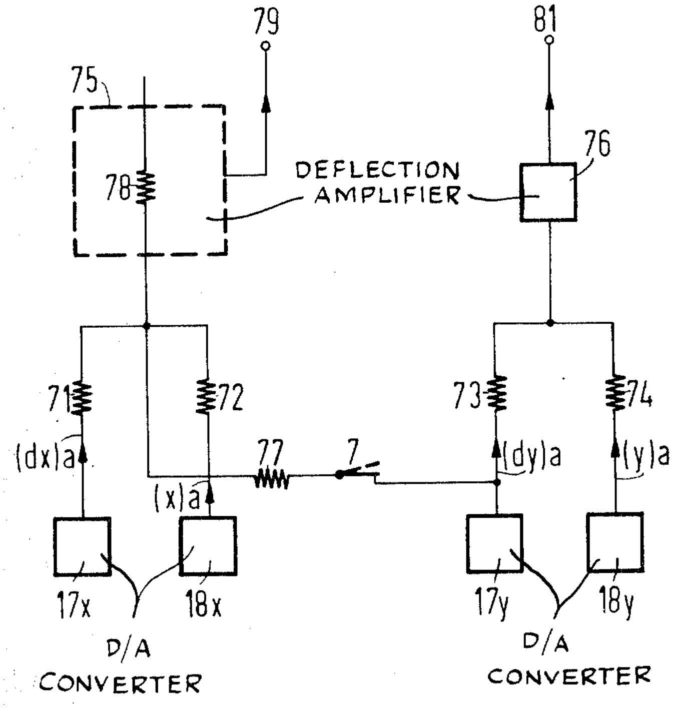
FIG. 18 illustrates, in greater detail, features of the circuit generally illustrated in block form in FIG. 11.

FIG. 18 illustrates, in greater detail, portions of the circuit illustrated in FIG. 11, in which the respective digital coordinate values are converted to analog values in respective digital-analog converter 17*x*, 18*x* and 17*y* and 18*y*. The respective values (*dy*)*a* and (*y*)*a* are conducted to the input of the deflection amplifier 76 over respective resistances 73 and 74, and in like manner the values (*dx*)*a* and (*x*)*a* are conducted to the amplifier 75 over respective resistances 71 and 72. It will be appreciated that the circuitry thus far described is operative to provide the respective analog deflection signals $(x + dx)a$ and $(y + dy)a$ for the production of a normal symbol. The value (*dy*)*a*, appearing at the output of the converter 17*y* is conducted over switch 7 and resistance 77 to the input of the amplifier 75, with the resistance 77 forming the dividing means and by its dimensioning, thus determining the number n. The three analog values (*dx*)*a*, (*x*)*a*, and (d(*dy*/*n*)*a* are thus combined, with the resistance 78 forming a common operational or load resistance. Thus, the *x*-deflection signal and the *y*-deflection signal appear at the respective terminals 79 and 81.

It will be appreciated that the circuit of FIG. 18 is especially simple, achieving the desired results merely by the additon of the resistance 77 and switch 7 to the respective circuits employed for deriving the normal deflection signals.

Having thus described my invention, it will be apparent from the above description that various immaterial modifications may be made in the same without departing from the spirit and scope of the invention.

I claim:

1. A circuit arrangement for selectively depicting like symbols with different configurations upon the picture screen of a cathode ray tube, utilizing cooperable intensity control of the cathode beam, and analog *x* and *y* coordinate deflection signals respectively derived from the corresponding digital reference point coordinate values, for designating the position at which the symbol involved is to be formed, and digital symbol point coordinate values, for designating the position of a beam-dot within the area in which the symbol is to be formed, which values are supplied by a symbol decoder, whereby an analog *x* deflection signal is derived from the corresponding digital reference and point coordinate values, and an analog *y* deflection signal is derived from the corresponding reference point digital coordinate values, comprising means including a first digital-analog converter and combining stages for converting the digital reference and point coordinate values for each pair thereof to form corresponding analog *x* and *y* deflection signals, a first resistor, said first analog-digital converter including a plurality of second resistors, and a first transistor having a collector-emitter path connected via said first resistor dependent on the reference point coordinate *x* values and via said second resistors dependent on the symbol point coordinates to the poles of an operational voltage source, and a second digital-analog converter including a plurality of third resistors and a second transistor having a collector-emitter path connected to said first resistor in common with said collector-emitter path of said first transistor and dependent on the symbol point coordinates via said third resistors to poles of the operational voltage source, said first resistor developing the *x* deflection signal.

2. A circuit arrangement according to claim 1, comprising a switch, and wherein said second transistor includes a base connected by way of said switch to a reference voltage which effects, in one position of said switch, a conductive emitter-collector path and in a second position of said switch a blocked emitter-collector path of said second transistor.

3. A circuit arrangement according to claim 2, wherein said base of said second transistor is coupled to an adjustable reference potential.

* * * * *